US012590416B2

(12) United States Patent
Heiskanen et al.

(10) Patent No.:  US 12,590,416 B2
(45) Date of Patent:      Mar. 31, 2026

(54) BIOBASED BARRIER FILM FOR PACKAGING MATERIAL

(71) Applicant: Stora Enso OYJ, Helsinki (FI)

(72) Inventors: Isto Heiskanen, Imatra (FI); Kaj Backfolk, Lappeenranta (FI); Katja Lyytikäinen, Imatra (FI)

(73) Assignee: Stora Enso OYJ, Helsinki (FI)

( * ) Notice:       Subject to any disclaimer, the term of this patent is extended or adjusted under 35 U.S.C. 154(b) by 164 days.

(21) Appl. No.:       18/566,361

(22) PCT Filed:       Jun. 3, 2022

(86) PCT No.:        PCT/IB2022/055190
§ 371 (c)(1),
(2) Date:        Dec. 1, 2023

(87) PCT Pub. No.:   WO2022/259105
PCT Pub. Date: Dec. 15, 2022

(65)           Prior Publication Data
US 2024/0263399 A1      Aug. 8, 2024

(30)       Foreign Application Priority Data

Jun. 10, 2021    (SE) .................................... 2150737-1

(51) Int. Cl.
| | |
|---|---|
| *D21H 21/16* | (2006.01) |
| *B32B 29/00* | (2006.01) |
| *B65D 65/40* | (2006.01) |
| *D21H 11/18* | (2006.01) |
| *D21H 19/12* | (2006.01) |
| *D21H 19/40* | (2006.01) |
| *D21H 19/46* | (2006.01) |
| *D21H 19/54* | (2006.01) |
| *D21H 23/22* | (2006.01) |
| *D21H 27/10* | (2006.01) |

(52) U.S. Cl.
CPC ........... *D21H 21/16* (2013.01); *B32B 29/005* (2013.01); *B65D 65/40* (2013.01); *D21H 11/18* (2013.01); *D21H 19/12* (2013.01); *D21H 19/40* (2013.01); *D21H 19/46* (2013.01); *D21H 19/54* (2013.01); *D21H 23/22* (2013.01); *D21H 27/10* (2013.01); *B32B 2255/12* (2013.01); *B32B 2255/24* (2013.01); *B32B 2307/718* (2013.01); *B32B 2307/7244* (2013.01); *B32B 2307/7246* (2013.01)

(58) Field of Classification Search
CPC ........ D21H 21/16; D21H 11/18; D21H 19/12; D21H 19/40; D21H 19/46; D21H 19/54; D21H 23/22; D21H 27/10; D21H 19/36; D21H 19/82; D21H 19/84; B32B 29/005; B32B 2255/12; B32B 2255/24; B32B 2307/718; B32B 2307/7244; B32B 2307/7246; B32B 27/10; C08J 2301/02; C08J 2403/06; C08J 2403/08; C08J 2403/10; C08J 7/048; C08J 7/0427; C08J 5/18; B65D 65/40
See application file for complete search history.

(56)           References Cited

U.S. PATENT DOCUMENTS

| | | | | |
|---|---|---|---|---|
| 12,152,345 B2 * | 11/2024 | Heiskanen | ............ | D21H 11/18 |
| 2006/0154832 A1 * | 7/2006 | Peltier | ............... | C10M 169/044 |
| | | | | 508/459 |
| 2007/0087190 A1 | 4/2007 | Akiyama et al. | | |
| 2021/0017717 A1 | 1/2021 | Backfolk et al. | | |
| 2021/0363701 A1 * | 11/2021 | Heiskanen | ............. | B32B 27/10 |
| 2024/0263399 A1 * | 8/2024 | Heiskanen | ............. | D21H 19/84 |

FOREIGN PATENT DOCUMENTS

| | | | | | |
|---|---|---|---|---|---|
| CN | 111764183 A | * | 10/2020 | ............... | D06P 1/48 |
| CN | 111764193 A | | 10/2020 | | |
| CN | 108625219 B | * | 3/2021 | ............ | D21H 19/14 |
| DE | 2338818 A1 | | 2/1974 | | |
| JP | 2019099950 A | | 6/2019 | | |
| SE | 546593 C2 | * | 12/2024 | ............ | D21H 27/10 |
| WO | 2013164646 A1 | | 11/2013 | | |
| WO | WO-2018211441 A1 | * | 11/2018 | ............ | D21H 27/10 |
| WO | WO-2019198040 A1 | * | 10/2019 | ............ | D21H 11/16 |
| WO | WO-2020123934 A2 | * | 6/2020 | ............ | D21H 19/58 |
| WO | 2021090192 A1 | | 5/2021 | | |
| WO | WO-2022259105 A1 | * | 12/2022 | ............ | D21H 27/10 |

OTHER PUBLICATIONS

International Search Report from corresponding PCT application No. PCT/IB2022/055190, mailed on Aug. 19, 2022.
Extended European Search Report from corresponding European application No. 22819715.8 dated Feb. 27, 2025.
Kelley L. Spence, et al., Water Vapor Barrier Properties of Coated and Filled Microfibrillated Cellulose Composite Films, BioResources 6(4), 4370-4388.

* cited by examiner

*Primary Examiner* — Jose A Fortuna
(74) *Attorney, Agent, or Firm* — Greer Burns & Crain Ltd.

(57)           ABSTRACT

The present invention relates to a biobased barrier film for a paper or paperboard-based packaging material, said barrier film comprising: a substrate layer and a coating layer disposed on at least one surface of the substrate layer, wherein said substrate layer has a grammage in the range of 1-60 $g/m^2$ and comprises at least 50 wt % of highly refined cellulose pulp based on the dry weight of the substrate layer, and wherein said coating layer has a grammage in the range of 1-15 $g/m^2$ and comprises at least 50 wt % of a film forming modified starch and 0.1-10 wt % of a biobased lubricant, based on the dry weight of the coating layer.

18 Claims, No Drawings

BIOBASED BARRIER FILM FOR PACKAGING MATERIAL

This application is a U.S. National Phase under 35 U.S.C. § 371 of International Application No. PCT/IB2022/055190, filed Jun. 3, 2022, which claims priority under 35 U.S.C. §§ 119 and 365 to Swedish Application No. 2150737-1 filed Jun. 10, 2021.

TECHNICAL FIELD

The present disclosure relates to biobased barrier films for paper and paperboard based packaging materials. More specifically, the present disclosure relates to barrier films based on highly refined cellulose with improved resistance towards oxygen, water vapor and grease. The present disclosure further relates to paper and paperboard based packaging materials comprising such barrier films and to methods for manufacturing such barrier films.

BACKGROUND

Coating of paper and paperboard with plastics is often employed to combine the mechanical properties of the paperboard with the barrier and sealing properties of a plastic film. Paperboard provided with even a relatively small amount of a suitable plastic material can provide the properties needed to make the paperboard suitable for many demanding applications, for example as liquid packaging board. In liquid packaging board, polyolefin coatings are frequently used as liquid barrier layers, heat sealing layers and adhesives. However, the recycling of such polymer coated board is difficult since it is difficult to separate the polymers from the fibers.

In many cases the gas barrier properties of the polymer coated paperboard are still insufficient. Therefore, in order to ensure acceptable gas barrier properties the polymer coated paperboard is often provided with one or more layers of aluminum foil. However, the addition of polymer and aluminum layers add significant costs and makes recycling of the materials more difficult. Also, due to its high carbon footprint there is a wish to replace aluminum foils in packaging materials in general, and in liquid packaging board in particular.

More recently, films and coatings comprising highly refined cellulose or microfibrillated cellulose (MFC) have been developed, in which defibrillated cellulosic fibrils have been dispersed e.g. in water and thereafter re-organized and rebonded together to form a dense film with excellent gas barrier properties. Unfortunately, the gas barrier properties of such films tend to deteriorate at high temperatures and high humidity.

When making films or coatings from suspensions comprising highly refined pulp, uneven formation and the occurrence of pinholes or is a major challenge. Pinholes can render these films or coatings unsuitable as barrier films or materials for food packaging, unless one or several additional coatings are applied on the substrate.

Coating with film forming polymers such as PVOH or latex emulsions provide good oil and grease barrier but also enhanced water vapor transmission rate (WVTR) and/or oxygen gas transmission rate (OTR). The problem associated with such polymers is that the required coat weight to get substantial improvement in the barrier performance is relatively high. Another problem especially with latex emulsions is that repulping and reuse of the coated materials is difficult. Many latexes also cause deposits in the paper machine (wet end, pressing section, drying section) and also create spots in the web, which is may lead to web breaks and is detrimental for ensuring good barrier performance.

Another problem with many coating solutions is the runnability at high speeds. High speed runnability on the coating unit is essential in order to ensure good and uniform barrier performance of the substrate. Poor water retention behavior of the coating dispersion or tendency to dilatancy will increase risk for dimensional stability problems with the web or streaks or stalagmites, respectively. Addition of platy minerals to the coating dispersion can improve barrier performance but might enhance the risk of shear induced agglomeration or flocculation especially when using contact coating methods.

Many runnability problems in the traditional pigment coating for graphical papers are solved by using functional additives such as surfactants or dispersing agents. Unfortunately, when used in barrier films such functional additives may affect barrier performance negatively.

Thus, there remains a need for improved barrier solutions to replace or reduce the use of plastic films and aluminum foils in packaging materials, while maintaining acceptable barrier properties. At the same time, there is a need to replace the conventional plastic films and aluminum foils with alternatives that facilitate re-pulping and recycling of the used packaging materials.

DESCRIPTION OF THE INVENTION

It is an object of the present disclosure to provide a biobased barrier film for paper and paperboard based packaging materials, which solves or ameliorates at least some of the above mentioned problems.

It is an object of the present disclosure to provide an alternative to the conventional plastic films and aluminum foils commonly used as barrier films in packaging materials, such as liquid packaging board.

It is a further object of the present disclosure, to provide a biobased barrier film, which has improved barrier properties towards oxygen, water vapor and grease.

It is a further object of the present disclosure to provide a barrier film for paper or paperboard based packaging materials and liquid packaging board, which facilitates re-pulping of the paper or paperboard based packaging material as compared to packaging materials comprising plastic films or aluminum foils as barrier films.

The above-mentioned objects, as well as other objects as will be realized by the skilled person in the light of the present disclosure, are achieved by the various aspects of the present disclosure.

According to a first aspect illustrated herein, there is provided a biobased barrier film for a paper or paperboard-based packaging material, said barrier film comprising:

a substrate layer and a coating layer disposed on at least one surface of the substrate layer, wherein said substrate layer has a grammage in the range of 1-60 g/m$^2$ and comprises at least 50 wt % of highly refined cellulose pulp based on the dry weight of the substrate layer, and wherein said coating layer has a grammage in the range of 1-15 g/m$^2$ and comprises at least 50 wt % of a film forming modified starch and 0.1-10 wt % of a biobased lubricant, based on the dry weight of the coating layer.

The inventive barrier film is suitable for use as a barrier film for a paper or paperboard-based packaging material.

The inventive combination of a modified starch and a biobased lubricant has been found to provide good barrier properties towards air, oxygen and water vapor, while at the same time having a low negative impact on re-pulping and recycling of the used barrier film. The inventive barrier film comprising a combination of a thin substrate layer and a coating layer comprising a film forming modified starch and a biobased lubricant can facilitate re-pulping and recycling of used packaging materials comprising the barrier film. The combination of a modified starch and a biobased lubricant has also been found to improve runnability of the film without affecting barrier performance negatively. The barrier film can be produced in a paper machine at high speed with good runnability.

Paper generally refers to a material manufactured in thin sheets from the pulp of wood or other fibrous substances comprising cellulose fibers, used for writing, drawing, or printing on, or as packaging material.

Paperboard generally refers to strong, thick paper or cardboard comprising cellulose fibers used for boxes and other types of packaging. Paperboard can either be bleached or unbleached, coated or uncoated, and produced in a variety of thicknesses, depending on the end use requirements.

A paper or paperboard based packaging material is a packaging material formed mainly, or entirely from paper or paperboard. In addition to paper or paperboard, the paper or paperboard-based packaging material may comprise additional layers or coatings designed to improve the performance and/or appearance of the packaging material.

The inventive barrier film can be used to manufacture a paper or paperboard based packaging material which is recyclable and may provide a reject rate according to PTS RH 021/97 of less than 30%, preferably less than 20%, more preferably less than 10%. This makes the inventive barrier film an interesting and viable alternative to the aluminum foil layer commonly used in packaging board for providing liquid and gas barrier properties. The inventive barrier film is further advantageous in that it can be realized without any extrusion coated or lamination coated polyolefin coatings often used in barrier layers for packaging materials.

The inventive barrier film is comprised of a substrate layer and a coating layer.

The substrate layer of the barrier film preferably comprises a film or sheet shaped material having a smooth, dense and relatively low porous surface on which the coating layer can be applied.

The grammage of the substrate layer is in the range of 1-60 $g/m^2$. The substrate layer may be provided either as a free-standing substrate film, or as a coating on a paper or paperboard base layer. The grammage of the substrate layer when provided in the form of a free-standing substrate film may typically be in the range of 20-60 $g/m^2$, preferably in the range of 20-50 $g/m^2$, and more preferably in the range of 30-40 $g/m^2$, whereas the grammage of the substrate layer when provided as a coating on a paper or paperboard base layer may be lower, such as in the range of 1-20 $g/m^2$, preferably in the range of 5-20 $g/m^2$.

The term biobased as used herein refers to products or materials wholly or partly derived from biomass, such as plants, trees or animals. Biobased is non-fossil based. The biomass can have undergone physical, chemical or biological treatment.

The substrate layer is preferably biobased and more preferably cellulose based. By biobased or cellulose based it is generally meant that more than 50% by weight of the substrate is of biomass, or preferably cellulosic origin. Using a cellulose based substrate layer is especially useful for barrier films for use in paper or paperboard laminates since the laminate can be recycled as a single material.

The substrate layer may consist of a single layer of material or it can be a multilayer structure comprised of two or more layers of the same or different materials. A multilayer structure can be formed using known multilayering techniques. The substrate layer may for example consist multilayer structure comprised of two layers, wherein each of the layers have a grammage of 15 $g/m^2$ or 20 $g/m^2$, resulting in a total grammage of 30 $g/m^2$ or 40 $g/m^2$, respectively.

The substrate layer comprises, or consists of, highly refined cellulose pulp. Refining, or beating, of cellulose pulps refers to mechanical treatment and modification of the cellulose fibers in order to provide them with desired properties.

The substrate layer comprises at least 50 wt % of highly refined cellulose pulp based on the dry weight of the substrate layer. In some embodiments, the substrate layer comprises at least 70 wt %, preferably at least 90 wt %, highly refined cellulose pulp based on the dry weight of the substrate layer.

In some embodiments, the highly refined cellulose pulp has a water retention value (WRV) of ≥250%, more preferably ≥300%. In addition, the WRV is preferably ≤500%, more preferably ≤450% or ≤400% or ≤350%. In some embodiments, the highly refined cellulose pulp has a WRV value of in the range of 250-400%, or 250-380%, or 250-350%, or 300-350%. The WRV value may be determined by standard ISO 23714 with the use of a 200 mesh wire.

The term highly refined cellulose pulp as used herein generally refers to a cellulose pulp having a Schopper-Riegler (SR) number above 70. Thus, in some embodiments, the highly refined cellulose pulp of the substrate layer has a Schopper-Riegler (SR) number above 70. In some embodiments, the highly refined cellulose pulp has a Schopper-Riegler (SR) number above 85, preferably above 90, as determined by standard ISO 5267-1. In some embodiments, the highly refined cellulose pulp of the substrate layer has a Schopper-Riegler (SR) number in the range of 70-90, and preferably in the range of 70-98, as determined by standard ISO 5267-1.

In some embodiments, the highly refined cellulose pulp has a content of fibers having a length >0.2 mm of at least 7 million fibers per gram based on dry weight, preferably at least 9 million fibers per gram based on dry weight, and more preferably at least 15 million fibers per gram based on dry weight. The content of fibers having a length >0.2 mm may for example be determined using the L&W Fiber tester Plus instrument (L&W/ABB).

In some embodiments, the highly refined cellulose pulp has a mean fibril area of fibers having a length >0.2 mm of at least 15%, preferably at least 17%, more preferably at least 20%. The mean fibril area is determined using the Fiber Tester Plus instrument. "Mean fibril area" as used herein refers to length weighted mean fibril area.

In some embodiments, the highly refined cellulose pulp has been subjected to considerable refining, but not to the extent that all of the cellulose pulp will pass through a 200 mesh screen (equivalent hole diameter 76 μm) of a conventional laboratory fractionation device (SCAN-CM 66:05).

In some embodiments, the highly refined cellulose pulp is microfibrillated cellulose. Microfibrillated cellulose (MFC) shall in the context of the patent application mean a cellulose particle, fiber or fibril having a width or diameter of from 20 nm to 1000 nm.

Various methods exist to make MFC, such as single or multiple pass refining, pre-hydrolysis followed by refining or high shear disintegration or liberation of fibrils. One or several pre-treatment steps is usually required in order to make MFC manufacturing both energy efficient and sustainable. The cellulose fibers of the pulp used when producing MFC may thus be native or pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxidation, for example "TEMPO"), or quaternary ammonium (cationic cellulose). After being modified or oxidized in one of the above-described methods, it is easier to disintegrate the fibers into MFC.

MFC can be produced from wood cellulose fibers, both from hardwood and softwood fibers. It can also be made from microbial sources, agricultural fibers such as wheat straw pulp, bamboo, bagasse, or other non-wood fiber sources. It can be made from pulp, including pulp from virgin fiber, e.g. mechanical, chemical and/or thermomechanical pulps. It can also be made from broke or recycled paper.

MFC may typically have a Schopper-Riegler (SR) number above 90, and preferably in the range of 90-98, as determined by standard ISO 5267-1.

In some embodiments, the substrate layer comprises a mixture of two or more different highly refined pulps. For example, the substrate may comprise a mixture of a highly refined cellulose pulp having a Schopper-Riegler (SR) number in the range of 70-90, and MFC having a Schopper-Riegler (SR) number in the range of 90-98, as determined by standard ISO 5267-1.

In some embodiments, the substrate layer further comprises unrefined or slightly refined cellulose pulp having a Schopper-Riegler (SR) number below 70, preferably below 60 and more preferably below 50, as determined by standard ISO 5267-1.

In some embodiments, the substrate layer comprises a mixture of highly refined cellulose pulp and unrefined or slightly refined cellulose pulp.

The highly refined cellulose of the substrate layer may preferably be crosslinked by a crosslinking agent. Crosslinking the highly refined cellulose of the substrate layer improves both the mechanical and chemical stability for the substrate layer. The crosslinking achieved by the crosslinking agent should preferably be covalent crosslinking. The crosslinking agent preferably comprises at least two functional groups capable of forming covalent bonds to functional groups present in the highly refined cellulose. The crosslinking may for example involve the formation of ester bonds, ether bonds, amide bonds between the functional groups of the crosslinking agent and the highly refined cellulose. The amount of crosslinker can be selected depending on the desired degree of crosslinking. Crosslinking may further be initiated or facilitated by using temperature, pH, a catalyst, or radiation (e.g. UV light radiation). The skilled person can identify suitable crosslinking agents and amounts depending on the type of highly refined cellulose and other circumstances.

One group of crosslinking agents which has been found especially useful in the barrier films of the present invention are multifunctional carboxylic acids, e.g. difunctional, trifunctional or polyfunctional carboxylic acids, or mixtures thereof. These crosslinking agents are water-soluble, typically have low or no toxicity, and are suitable for crosslinking both the highly refined cellulose of the substrate layer and the starch of the coating layer, leading to further improved adhesion and protective properties. Examples of suitable multifunctional carboxylic acid crosslinking agents include, but are not limited to as citric acid, malic acid, succinic acid, tartaric acid, and 1,2,3,4-butanetetracarboxylic acid.

Thus, in some embodiments, the highly refined cellulose of the substrate layer is crosslinked by a multifunctional carboxylic acid crosslinking agent. In some embodiments, the multifunctional carboxylic acid is selected from the group consisting of citric acid, malic acid, succinic acid, tartaric acid, and 1,2,3,4-butanetetracarboxylic acid, or a combination thereof. In a preferred embodiment, the multifunctional carboxylic acid is citric acid.

It is also possible to use a higher molecular weight polycarboxylic acid as the crosslinking agent. Examples of such higher molecular weight polycarboxylic acids include, but are not limited to polymaleic acid and poly(methyl vinyl ether-co-maleic acid).

The amount of the crosslinking agent in the substrate layer is preferably in the range of 1-50 wt % based on the weight of the highly refined cellulose.

The substrate layer may further comprise additives such as starch, carboxymethyl cellulose, a filler, retention chemicals, flocculation additives, deflocculating additives, dry strength additives, softeners, or mixtures thereof.

High surface roughness of the substrate layer may cause problems with runnability and converting of the film. Therefore, it may be preferred to subject the substrate layer to a surface treatment in order to control the roughness of the film.

In some embodiments, the substrate layer has been subjected to a surface treatment to improve the smoothness and decrease the porosity of the substrate layer surface and make the surface more suitable for applying a coating layer thereon. Possible surface treatments include, but are not limited to providing the surface with a smoothening precoat or mechanical smoothening, e.g. by calendering.

The surface treatment may for example include applying a precoat layer to the substrate layer. The precoat layer preferably acts to level out unevenness, and fill pores and pinholes present in the substrate layer.

Calendering may include hard nip or soft nip calendering in one or several passes or nips. The mechanical smoothening can also be combined with a precoating step, performed before or after the calendering.

The substrate layer should preferably have few or no pinholes. In some embodiments, the substrate comprises less than 10 pinholes/m$^2$, preferably less than 8 pinholes/m$^2$, and more preferably less than 2 pinholes/m$^2$. The amount of pinholes per m$^2$ may for example be measured by optical inspection, for example according to standard EN13676: 2001.

The substrate layer preferably has a Gurley Hill porosity value of 5000 s/100 ml or more, preferably 10 000 s/100 ml or more. The Gurley Hill porosity value of the substrate layer is typically 40 000 s/100 ml or less, more typically 30 000 s/100 ml or less, and more typically 20 000 s/100 ml or less. However, less porous substrate layers having a Gurley Hill porosity value above 40 000 s/100 ml may also be used. In some embodiments, the substrate layer has a Gurley Hill porosity in the range of 5000-20 000 s/100 ml, preferably in the range of 10 000-20 000 s/100 ml, as measured according to standard ISO 5636/5.

In some embodiments, the substrate layer has a specific formation of less than 1 $g^{0.5}$/m, and preferably less than 0.8 $g^{0.5}$/m, as determined according to SCAN-P 92. In some embodiments, the substrate layer has a tensile index (md) above 90 Nm/g and a tensile index (cd) higher than 40 Nm/g, and a tensile strength geometric mean above 1.8, and preferably above 2, as determined according to ISO 1924-3. The tearing index (md and/or cd) is preferably higher than 3 $mNm^2$/g, and the tearing index geometric mean value is preferably higher than 90, and more preferably higher than 100, as determined according to ISO 1974. The biobased barrier film further comprises a coating layer disposed on at least one surface of the substrate layer.

The coating layer has a grammage in the range of 1-15 $g/m^2$ and comprises at least 50 wt % of a film forming modified starch and 0.1-10 wt % of a biobased lubricant, based on the dry weight of the coating layer.

The film forming modified starch is the main component of the coating layer. Accordingly, the coating layer is also biobased. In some embodiments, the coating layer comprises at least 70 wt %, preferably at least 90 wt %, of the film forming modified starch based on the dry weight of the coating layer.

The film forming modified starch is a modified starch or a combination of modified starches. Examples of modified starches that could be used as the film forming modified starch in the coating layer include, but are not limited to the group consisting of hydroxyalkylated starch, dialdehyde starch, anionic starch, cationic starch, non-ionic starch, amphoteric starch, dextrins, pyrodextrins, cyanoethylated starch, starch ethers, starch esters, grafted starch, hydrophobic starch, and combinations thereof. In some embodiments, the film forming modified starch is selected from the group consisting of a hydroxyalkylated starch, dialdehyde starch, OSA starch, and combinations thereof. In some embodiments, the film forming modified starch is selected from the group consisting of a hydroxypropylated starch, dialdehyde starch, OSA starch, and combinations thereof.

The film forming modified starch can comprise a combination of two or more modified starches. Examples of mixtures include:

70% hydroxypropylated starch-30% OSA starch
50% hydroxypropylated starch-50% dextrin
50% hydroxypropylated starch-50% dialdehyde starch.

In addition to the film forming modified starch, the coating layer also comprises 0.1-10 wt % of a biobased lubricant, based on the dry weight of the coating layer. In some embodiments, the coating layer comprises 0.1-5 wt %, preferably 0.5-5 wt %, preferably 0.1-2 wt % or even more preferably 0.5-2 wt %, biobased lubricant based on the dry weight of the coating layer.

In some embodiments the biobased lubricant comprises a hydrophobic portion, typically a nonpolar portion, such as an alkane portion. Examples of biobased lubricants useful in the inventive barrier film include fatty acids, such as stearic acid, lauric acid, palmitic acid, behenic acid, linoleic acid and oleic acid, and metallic salts thereof. Other useful biobased lubricants include wax emulsions (e.g. paraffin or microcrystalline waxes), and soy lecithin.

In some embodiments, the biobased lubricant comprises a metallic salt of a fatty acid. In some embodiments, the biobased lubricant is a metallic salt of a fatty acid. In some embodiments, the fatty acid is selected from the group consisting of stearic acid, lauric acid, palmitic acid, behenic acid, linoleic acid and oleic acid, and combinations thereof. In a preferred embodiment, the fatty acid is stearic acid. In some embodiments, the metal of the metallic salt is selected from the group consisting of calcium, magnesium and zinc, and combinations thereof. In some embodiments, the metal of the metallic salt is calcium. Preferably, the biobased lubricant is calcium stearate.

In some embodiments, the biobased lubricant comprises a combination of two or more metallic salts of fatty acids. In some embodiments, the biobased lubricant is a combination of two or more metallic salts of fatty acids. In some embodiments, the biobased lubricant is a combination of calcium stearate and a metallic salt of a fatty acid selected from the group consisting of lauric acid, palmitic acid, behenic acid, linoleic acid and oleic acid.

The coating layer may further comprise a platy mineral in an amount of 1-10 wt %, based on the dry weight of the coating layer. The platy mineral is preferably a high aspect clay mineral, such as kaolin. Other useful platy minerals include talc and mica. In some embodiments, the coating layer further comprises 1-10 wt % of a platy mineral, preferably selected from the group consisting of kaolin, talc and mica, based on the dry weight of the coating layer.

The film forming modified starch of the coating layer may preferably be crosslinked by a crosslinking agent. Various crosslinking agents can be used depending on the film forming modified starch used.

Crosslinking the film forming modified starch of the coating layer improves both the mechanical and chemical stability for the coating layer, enhancing the protection of the substrate layer. The crosslinking achieved by the crosslinking agent should preferably be covalent crosslinking. The crosslinking agent preferably comprises at least two functional groups capable of forming covalent bonds to functional groups present in the film forming modified starch. The crosslinking may for example involve the formation of ester bonds, ether bonds, amide bonds between the functional groups of the crosslinking agent and the film forming modified starch. The amount of crosslinker can be selected depending on the desired degree of crosslinking. Crosslinking may further be initiated or facilitated by using temperature, pH, a catalyst, or radiation (e.g. UV light radiation). The skilled person can identify suitable crosslinking agents and amounts depending on the type of film forming modified starch and other circumstances.

One group of crosslinking agents which has been found especially useful in the barrier films of the present invention are multifunctional carboxylic acids, e.g. difunctional, trifunctional or polyfunctional carboxylic acids, or mixtures thereof. These crosslinking agents are water-soluble, typically have low or no toxicity, and are suitable for crosslinking both the highly refined cellulose of the substrate layer and the starch of the coating layer, leading to further improved adhesion and protective properties. Examples of suitable multifunctional carboxylic acid crosslinking agents include, but are not limited to as citric acid, malic acid, succinic acid, tartaric acid, and 1,2,3,4-butanetetracarboxylic acid.

Thus, in some embodiments, the film forming modified starch of the coating layer is crosslinked by a multifunctional carboxylic acid crosslinking agent. In some embodiments, the multifunctional carboxylic acid is selected from the group consisting of citric acid, malic acid, succinic acid, tartaric acid, and 1,2,3,4-butanetetracarboxylic acid, or a combination thereof. In a preferred embodiment, the multifunctional carboxylic acid is citric acid.

It is also possible to use a higher molecular weight polycarboxylic acid as the crosslinking agent. Examples of such higher molecular weight polycarboxylic acids include, but are not limited to polymaleic acid and poly(methyl vinyl ether-co-maleic acid).

The amount of the crosslinking agent in the coating layer is preferably in the range of 1-50 wt % based on the weight of the film forming modified starch.

The coating layer may further comprise other functional additives including, but not limited to, insolubilizers, rheology modifiers, dispersants, preservatives, antistatic agents, water retention agents, defoaming agents.

Example of insolubilizers include, but are not limited to glyoxal, amino resins, and metal salts such as ammonium zirconium carbonate and zink salts, and zirconium chelates. Another preferred insolubilizer is polyamidoamine-epichlorohydrin resin (PAE).

The grammage of the coating layer is in the range of 1-15 $g/m^2$, preferably in the range of 2-10 $g/m^2$, and more preferably in the range of 3-8 $g/m^2$. The coating layer can be provided on one side or both sides of the substrate layer. The coating layer can be single, double or triple layer coating. Coatings having a grammage of 10 $g/m^2$ or higher may preferably be applied in two or more coating steps. When the coating is applied in two or more coating steps, all components of the coating layer may be applied in each step, or different components of the coating layer may be applied in different steps. For example starch and platy mineral could be applied in a first step, starch and lubricant could be applied in a second step, and an insolubilizer and/or crosslinking agent could be applied in a third step.

The total grammage of the biobased barrier film is preferably in the range of 10-75 $g/m^2$. In some embodiments, the total grammage of the biobased barrier film is in the range of 20-75 $g/m^2$, preferably in the range of 25-60 $g/m^2$, and more preferably in the range of 30-50 $g/m^2$.

High surface roughness of the substrate layer and/or finished biobased barrier film may cause problems with runnability and converting of the film. Therefore, it may be preferred to subject the biobased barrier film to calendering in order to control the roughness of the film.

In some embodiments, the biobased barrier film has been subjected to calendering to further improve the smoothness and decrease the porosity of the film. Calendering may include hard nip or soft nip calendering in one or several passes or nips. Calendering of the film further improves the barrier properties of the film. Without wishing to be bound to any scientific theory, it is believed that the biobased lubricant can aid the calendering, and that the calendering may at the same time help to redistribute the biobased lubricant in the film, leading to improved barrier properties.

There is a demand for improved solutions to replace aluminum foils and polyolefin films as barrier layers in packaging materials, such as liquid packaging board, with alternatives that facilitate re-pulping and recycling of the used packaging materials. The inventive barrier film can advantageously be manufactured almost entirely from biobased materials, and preferably from polysaccharide based materials, such as cellulose and starch, thereby facilitating re-pulping and recycling of used paper and paperboard based packaging materials comprising the barrier film. Packaging materials, containing 95% by weight or more of cellulosic material, with the remaining 5% being other materials that will not affect recycling of the packaging material, are sometimes referred to as monomaterials.

In some embodiments, more than 90% by weight, preferably more than 95% by weight, of the barrier film is biobased. In some embodiments, more than 90% by weight, preferably more than 95% by weight, of the barrier film is polysaccharide based.

The coating layer reduces the permeability of the barrier film for gases and vapors. For example, the coating layer reduces the permeability of the barrier film for air, oxygen and water vapor.

In some embodiments, the barrier film has a Gurley Hill porosity above 30 000 s/100 ml, preferably above 40 000 s/100 ml, as measured according to standard ISO 5636/5.

In some embodiments, the barrier film has an oxygen transfer rate (OTR), measured according to the standard ASTM D-3985 at 50% relative humidity and 23° C., of less than 150 $cc/m^2/day$, and preferably less than 50 $cc/m^2/day$.

In some embodiments, the barrier film has a water vapor transfer rate (WVTR), measured according to the standard ASTM F1249 at 50% relative humidity and 23° C., of less than 250 $g/m^2/day$, and preferably less than 200 $g/m^2/day$.

The biobased lubricant may increase the hydrophobicity and the water repellence of the coating layer. In some embodiments, the coating layer has a water contact angle, which is higher than the water contact angle of a corresponding film without the biobased lubricant. In some embodiments, the water contact angle of the coating layer is above 60°, preferably above 70°.

The biobased lubricant may reduce the friction of the coating layer against other surfaces. The good runnability of the inventive barrier film may, at least in part, be due to reduced friction imparted by the biobased lubricant.

The inventive barrier film may preferably be used as a barrier layer in a paper or paperboard based packaging material, particularly in packaging board, liquid packaging board (LPB), paper pouches or paper or paperboard tubes or cups, for use in the packaging of liquids or liquid containing products. Therefore, according to a second aspect illustrated herein, there is provided a paper or paperboard based packaging material comprising:

a paper or paperboard base layer; and a barrier film according to the first aspect.

In some embodiments, the paper or paperboard base layer has a basis weight in the range of 20-500 $g/m^2$, preferably in the range of 80-400 $g/m^2$.

The barrier film of the paper or paperboard based packaging material according to the second aspect may be further defined as set out above with reference to the first aspect.

In some embodiments, the barrier film is laminated onto the base layer using an adhesive polymer layer disposed between the base layer and the barrier film.

Thus, in some embodiments the paper or paperboard based packaging material further comprises an adhesive polymer layer disposed between the base layer and the barrier film.

In other embodiments, the substrate of the barrier film is a part of the paper or paperboard base layer. The substrate of the barrier film may for example have been laminated to the base layer using an adhesive, or wet laid onto the base layer.

In some embodiments, the paper or paperboard based packaging material comprises a paper or paperboard base layer;

a first barrier film according to the first aspect; and a second barrier film according to the first aspect;

wherein the base layer is sandwiched between said first barrier film and said second barrier film.

In some embodiments, the paper or paperboard based packaging material has a reject rate according to PTS RH 021/97 of less than 30%, preferably less than 20%, more preferably less than 10%.

In some embodiments, the barrier film is used as a barrier layer in a liquid packaging board (LPB). In some embodiments, the liquid packaging board comprises the layers: Extruded Polyolefin/Paperboard/Extruded Polyolefin/Barrier Film/Extruded Polyolefin In some embodiments, the extruded plyolefin is a polyethylene (PE).

According to a third aspect illustrated herein, there is provided a container, particularly a liquid packaging container, comprising a barrier film according to the first aspect or a paper or paperboard based packaging material according to the second aspect.

According to a fourth aspect illustrated herein, there is provided a method for manufacturing a barrier film for a paper or paperboard based packaging material, comprising the steps of:

a) providing a substrate layer, wherein said substrate layer has a grammage in the range of 1-60 $g/m^2$ and comprises at least 50 wt % of highly refined cellulose pulp based on the dry weight of the substrate layer;

b) applying an aqueous coating composition on at least one surface of the substrate layer, wherein said aqueous coating composition comprises at least 50 wt % of a film forming modified starch and 0.1-10 wt % of a biobased lubricant, based on the dry weight of the aqueous coating composition; and c) drying the aqueous coating composition to obtain a coating layer disposed on at least one surface of the substrate layer, wherein said coating layer has a grammage in the range of 1-15 $g/m^2$.

The substrate layer, the highly refined cellulose pulp, the film forming modified starch, and the biobased lubricant may be further defined as described above with reference to the first aspect.

In some embodiments, the substrate layer comprises at least at least 70 wt %, preferably at least 90 wt %, highly refined cellulose pulp based on the dry weight of the substrate layer.

In some embodiments, the substrate layer has a Gurley Hill porosity in the range of 5000-20 000 s/100 ml, as measured according to standard ISO 5636/5.

The coating layer is preferably applied by means of a liquid film coating process, i.e. in the form of an aqueous coating composition which, on application, is spread out to a thin, uniform layer on the substrate and thereafter dried. The coating layer can be applied by contact or non-contact coating methods.

For application on the substrate layer, non-contact coating methods or soft application and levelling of coating are typically preferred to minimize the risk of damage to the substrate layer during coating. Examples of useful coating methods include, but are not limited to rod coating, curtain coating, film press coating, cast coating, transfer coating, size press coating, flexographic coating, gate roll coating, twin roll HSM coating, blade coating, such as short dwell time blade coating, jet applicator coating, spray coating, gravure coating or reverse gravure coating.

In some embodiments, the aqueous coating composition is applied in the form a foam. Foam coating is advantageous as it allows for film forming at higher solids content and lower water content compared to an unfoamed coating. The lower water content of a foam coating also reduces the problems with rewetting of the substrate layer and may prevent unwanted absorption of the coating into the substrate material. The foam may be formed using a polymeric or non-polymeric foaming agent. Examples of polymeric foaming agents include PVOH, hydrophobically modified starch, and hydrophobically modified ethyl hydroxyethyl cellulose. In some embodiments, the film forming modified starch of the coating layer also acts as the polymeric foaming agent. An example of a non-polymeric foaming agent is sodium dodecyl sulfate (SDS).

To minimize the risk of pinholes in the coating layer, the coating layer may preferably be applied in at least two different coating steps with drying of the coated film between the steps. Coatings having a grammage of 10 $g/m^2$ or higher may preferably be applied using at least two coating steps.

In some embodiments, the aqueous coating composition comprises at least 70 wt %, preferably at least 90 wt %, of the film forming modified starch based on the dry weight of the aqueous coating composition.

In some embodiments, the film forming modified starch is selected from the group consisting of a hydroxyalkylated starch, a dialdehyde starch, OSA starch, and combinations thereof.

In some embodiments, the aqueous coating composition comprises 0.1-5 wt %, preferably 0.1-2 wt %, biobased lubricant based on the dry weight of the aqueous coating composition.

The biobased lubricant used is preferably a metallic salt of a fatty acid, i.e. a metallic soap, such as calcium stearate. Other useful biobased lubricants include wax emulsions (e.g. paraffin or microcrystalline waxes), soy lecithin, and oleic acids.

In some embodiments, the biobased lubricant comprises a metallic salt of a fatty acid. In some embodiments, the biobased lubricant is a metallic salt of a fatty acid. In some embodiments, the fatty acid is selected from the group consisting of stearic acid, lauric acid, palmitic acid, behenic acid, linoleic acid and oleic acid, and combinations thereof. In a preferred embodiment, the fatty acid is stearic acid. In some embodiments, the metal of the metallic salt is selected from the group consisting of calcium, magnesium and zinc, and combinations thereof. In some embodiments, the metal of the metallic salt is calcium. Preferably, the biobased lubricant is calcium stearate.

In some embodiments, the biobased lubricant comprises a combination of two or more metallic salts of fatty acids. In some embodiments, the biobased lubricant is a combination of two or more metallic salts of fatty acids. In some embodiments, the biobased lubricant is a combination of calcium stearate and a metallic salt of a fatty acid selected from the group consisting of lauric acid, palmitic acid, behenic acid, linoleic acid and oleic acid.

In some embodiments the biobased lubricant is present in the form of an oil-in-water emulsion comprising particles with having an average particle diameter of less than 20 μm, preferably less than 15 μm, and more preferably less than 10 μm.

In some embodiments, the aqueous coating composition further comprises 1-10 wt % of a platy mineral, preferably selected from the group consisting of kaolin, talc and mica, based on the dry weight of the aqueous coating composition. The term "platy mineral" as used herein refers to a mineral having an aspect ratio above 10.

In some embodiments, the total solid content of the aqueous coating composition is in the range of 10-60 wt %, preferably in the range of 12-50 wt %, and more preferably in the range of 15-40 wt %.

In some embodiments, the viscosity of the aqueous coating composition is in the range of 30-3000 centipoise, preferably in the range of 30-1500 centipoise (Brookfield viscosity determined at 100 rpm).

In some embodiments, the lubricant is premixed with the platy mineral before being added to an aqueous composition comprising the film forming modified starch. This ensures better mixing of the platy mineral in the dispersion. In some embodiments, the lubricant is premixed with the platy mineral at an elevated temperature such as above 40° C., preferably above 50° C., and more preferably above 60° C.

In some embodiments, the film forming modified starch of the coating layer is crosslinked by a multifunctional carboxylic acid crosslinking agent, or a salt thereof. In some embodiments, the multifunctional carboxylic acid is selected from the group consisting of citric acid, malic acid, succinic acid, tartaric acid, and 1,2,3,4-butanetetracarboxylic acid, or a combination thereof. In a preferred embodiment, the multifunctional carboxylic acid is citric acid. In a preferred embodiment, the multifunctional carboxylic acid is citric acid salt.

It is also possible to use a higher molecular weight polycarboxylic acid as the crosslinking agent. Examples of such higher molecular weight polycarboxylic acids include, but are not limited to polymaleic acid and poly(methyl vinyl ether-co-maleic acid).

The crosslinker may be buffered with a base, such as NaOH or KOH, to a higher pH.

In some embodiments, the crosslinking pH is below 7, preferably in the range of 3-7, more preferably in the range of 3.5-6.5.

The amount of the crosslinking agent is preferably in the range of 1-50 wt % based on the weight of the film forming modified starch.

The drying of the aqueous coating composition may preferably be performed at a temperature above room temperature, i.e. above 20° C. In some embodiments, the drying is performed at a temperature of at least 70° C., preferably at least 80° C., and more preferably at least 88° C. In some embodiments, the drying of the aqueous coating composition is performed at a temperature above the melting temperature of the biobased lubricant. In some embodiments, the drying is performed at a temperature in the range of 120-200° C., preferably in the range of 140-200° C., more preferably in the range of 160-200° C. Drying can for example be achieved using hot air, IR radiation, or a combination thereof.

In some embodiments, the coating layer is subjected to thermal treatment at a temperature above the melting temperature of the biobased lubricant. In some embodiments, the coating layer is further subjected to thermal treatment at a temperature in the range of 120-200° C., preferably in the range of 140-200° C., more preferably in the range of 160-200° C.

In some embodiments, more than 90% by weight, preferably more than 95% by weight, of the barrier film is cellulose based.

The total grammage of the biobased barrier film is preferably in the range of 10-75 g/m². In some embodiments, the total grammage of the biobased barrier film is in the range of 20-75 g/m², preferably in the range of 25-60 g/m², and more preferably in the range of 30-50 g/m².

High surface roughness of the substrate layer and/or the finished biobased barrier film may cause problems with runnability and converting of the film. Therefore, it may be preferred to subject the biobased barrier film to calendering in order to control the roughness of the film.

In some embodiments, the biobased barrier film is further subjected to calendering to further improve the smoothness and decrease the porosity of the film. Calendering has been found especially useful for films according to the present invention comprising a biobased lubricant. Calendering of the film further improves the barrier properties of the film. Without wishing to be bound to any scientific theory, it is believed that the biobased lubricant can aid the calendering, and that the calendering may at the same time help to redistribute the biobased lubricant in the film, leading to improved barrier properties.

Calendering may include hard nip or soft nip calendering in one or several passes or nips. In some embodiments, a shoe or metal belt calender is used. The calender pressure may typically be 20 kN/m or higher, preferably between 20-350 kN/m.

In some embodiments, the calendering is performed at a temperature of at least 70° C., preferably at least 80° C., and more preferably at least 88° C. In some embodiments, the calendering is performed at a temperature above the melting temperature of the biobased lubricant. In some embodiments, the calendering is performed at a temperature in the range of 120-200° C., preferably in the range of 140-200° C., more preferably in the range of 160-200° C.

The inventive barrier films are intended for use as barrier films in paper and paperboard packaging materials. The combination of the substrate layer comprising highly refined cellulose pulp and the coating layer comprising the film forming modified starch and biobased lubricant has been found to provide the barrier film with excellent gas barrier properties and water vapor barrier properties.

In some embodiments, the obtained barrier film has a Gurley Hill porosity above 30 000 s/100 ml, preferably above 40 000 s/100 ml, as measured according to standard ISO 5636/5.

In some embodiments, the obtained barrier film has an oxygen transfer rate (OTR), measured according to the standard ASTM D-3985 at 50% relative humidity and 23° C., of less than 150 cc/m²/day, and preferably less than 50 cc/m²/day.

In some embodiments, the obtained barrier film has a water vapor transfer rate (WVTR), measured according to the standard ASTM F1249 at 50% relative humidity and 23° C., of less than 250 g/m²/day, and preferably less than 200 g/m²/day.

The inventive barrier film will typically exhibit good resistance to grease and oil. Grease resistance of the barrier film is evaluated by the KIT-test according to standard ISO 16532-2. The test uses a series of mixtures of castor oil, toluene and heptane. As the ratio of oil to solvent is decreased, the viscosity and surface tension also decrease, making successive mixtures more difficult to withstand. The performance is rated by the highest numbered solution which does not darken the film sheet after 15 seconds. The highest numbered solution (the most aggressive) that remains on the surface of the paper without causing failure is reported as the "kit rating" (maximum 12). In some embodiments, the KIT value of the barrier film is at least 8, preferably at least 10, as measured according to standard ISO 16532. The oil and grease resistance (OGR) can also be measured with a chicken fat-method by the standard ASTM F119-8 at 60° C.

In some embodiments, the method further comprises laminating the barrier film or the substrate layer of the barrier film onto a paper or paperboard base layer.

In some embodiments, the substrate layer in step a) is provided on a paper or paperboard base layer.

Generally, while the products, polymers, materials, layers and processes are described in terms of "comprising" various components or steps, the products, polymers, materials, layers and processes can also "consist essentially of" or "consist of" the various components and steps.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

EXAMPLES

In order to evaluate the barrier film of the invention, a test was performed in which the oxygen transmission rates (OTR), water vapor transmission rates (WVTR), and grease resistance of the inventive films were compared reference films. All results are presented in Table 1.

Example 1. Uncoated Substrate (Comparative)

An uncoated 37.4 $g/m^2$ base substrate was prepared from highly refined cellulose pulp on a fourdrinier paper machine. The substrate contained highly refined softwood pulp refined to an SR value >90 and having a fibril area of about 20% (>0.2 mm) and an amount of fibers of about 15 million per gram of sample (>0.2 mm) as determined using the L&W Fiber tester Plus instrument (L&W/ABB).

The Gurley Hill value of the substrate varied between 11 400 and 17 000 s/100 ml when determined at various positions, indicating an uneven substrate and the presence of pinholes. When evaluating grease resistance with the chicken fat-method, the sample showed no resistance towards fat. The grease resistance (OGR) was determined by a modified version of the standard ASTM F119-8 at 60° C. using a for flat specimen (the standard includes also testing of creased into and creased away samples but these were not tested here). The other minor modifications to the standard were the number of parallel tests (2 instead of 3), the lack of thickness reported with the results, and the slightly different inspection intervals of specimen failure.

Example 2. Starch Coated Substrate (Comparative)

The uncoated substrate of example 1 was used as substrate. One side of the substrate was coated with an aqueous hydroxypropylated starch composition at concentration of 15 wt %. The applied coat weight was 6.6 $g/m^2$.

The Gurley Hill value of the coated substrate was 42 300 s/100 ml which was the maximum value of the instrument used for testing. However, no improvement in grease resistance was seen as compared to the uncoated substrate.

Example 3. Substrate Coated with Starch and 1% Calcium Stearate

The uncoated substrate of example 1 was used as substrate. One side of the substrate was coated with an aqueous composition comprising hydroxypropylated starch at concentration of 15 wt % and calcium stearate at a concentration of 1 wt % based on the amount of starch. The applied coat weight was 4.6 $g/m^2$. The coated substrate was subjected to thermal treatment for 5 min in 160° C.

Despite the slightly lower coat weight than in example 2, the grease resistance of the coated substrate was >24 h.

The WVTR of the coated substrate was 92 $g/m^2$/day (23° C./50% RH) and the OTR was 110 $cc/m^2$/day (23° C./50% RH).

Example 4. Substrate Coated with Starch and 2% Calcium Stearate

The uncoated substrate of example 1 was used as substrate. One side of the substrate was coated with an aqueous composition comprising hydroxypropylated starch at concentration of 15 wt % and calcium stearate at a concentration of 2 wt % based on the amount of starch. The applied coat weight was 4.4 $g/m^2$. The coated substrate was subjected to thermal treatment for 5 min in 160° C.

Despite the slightly lower coat weight than in example 2, the grease resistance of the coated substrate was >56 h.

Compared to Example 3, the WVTR of the coated substrate was further reduced (improved) from 92 to 77 $g/m^2$/day (23° C./50% RH).

Example 5. Uncoated Substrate (Comparative)

A lower grammage base substrate was prepared from highly refined cellulose pulp on a fourdrinier paper machine. The substrate had a grammage of 35.5 $g/m^2$. The substrate contained highly refined softwood pulp refined to an SR value >90 and having a fibril area of about 20% (>0.2 mm) and an amount of fibers of about 15 million per gram of sample (>0.2 mm) as determined using the L&W Fiber tester Plus instrument (L&W/ABB).

The Gurley Hill value of the substrate was 14 800 s/100 ml. OTR measurements failed, whereas the WVTR value of the substrate was 182 $g/m^2$/day. The grease resistance was less than 15 min.

Example 6. Substrate Coated with Starch and 10% Kaolin (Comparative)

The uncoated substrate of example 5 was used as substrate. One side of the substrate was coated with an aqueous composition comprising hydroxypropylated starch at concentration of 15 wt % and platy kaolin mineral, Barrisurf LX, at a concentration of 10 wt % based on the amount of starch. The applied coat weight was 5.7 $g/m^2$.

The Gurley Hill value of the coated substrate was 42 300 s/100 ml. The OTR was improved to the point that it became measurable, but still not very good. An improvement in the grease resistance was also seen.

Example 7. Substrate Coated with Starch, 1% Calcium Stearate, and 10% Kaolin

The uncoated substrate of example 5 was used as substrate. One side of the substrate was coated with an aqueous composition comprising hydroxypropylated starch at concentration of 15 wt %, calcium stearate at a concentration of 1 wt % based on the amount of starch, and platy kaolin mineral, Barrisurf LX, at a concentration of 10 wt % based on the amount of starch. The applied coat weight was 8 $g/m^2$.

The Gurley Hill value of the coated substrate was 42 300 s/100 ml. The OTR and the grease resistance was significantly improved compared to the coated substrate in example 6 without calcium stearate.

Example 8. Substrate Coated with Starch, 1% Calcium Stearate, and 10% Kaolin

In this case, the sample prepared in Example 7 was subjected to thermal treatment at 160° C. for 5 minutes. The thermal treatment resulted in further improved OTR and WVTR values.

Unless otherwise stated, the physical properties discussed in the present disclosure are determined according to the following standards:

Tensile index (Nm/g): ISO 1924-3

Specific Formation (g^0.5/m): SCAN-P 92

Tear index ($mNm^2$/g): ISO 1974

Grammage ($g/m^2$): ISO 536

Tearing resistance (mN): ISO 1974

17

Air resistance (s/100 ml), Gurley Hill: ISO 5636/5

OTR was measured with a Mocon Oxtran 2/22 device according to the standard ASTM D-3985 at 50% relative humidity and 23° C.

WVTR was measured with a Mocon Permatran 3/34 according to the standard ASTM F1249 at 50% relative humidity and 23° C.

Grease resistance (OGR) was measured according to a modified standard ASTM F119-8 at 60° C.

Bulk, single sheet (cm³/g): ISO 534 md=machine direction cd=cross direction

N.D.=Not determined

Unless otherwise stated, the standard method can be applied for determining physical and mechanical properties in both cross direction (cd) and machine direction (md).

18 of: a hydroxyalkylated starch, a dialdehyde starch, OSA starch, and combinations thereof.

7. The barrier film according to claim 1, wherein the coating layer comprises 0.1-5 wt % biobased lubricant based on the dry weight of the coating layer.

8. The barrier film according to claim 1, wherein the biobased lubricant is a metallic salt of a fatty acid.

9. The barrier film according to claim 1, wherein the coating layer further comprises between 1-10 wt % of a platy mineral, based on the dry weight of the coating layer.

10. The barrier film according to claim 1, wherein more than 90% by weight, of the barrier film is biobased.

11. The barrier film according to claim 1, wherein the barrier film has a Gurley Hill porosity above 30,000 s/100 ml, as measured according to standard ISO 5636/5.

TABLE 1

| | Example 1 | Example 2 | Example 3 | Example 4 | Example 5 | Example 6 | Example 7 | Example 8 |
|---|---|---|---|---|---|---|---|---|
| Furnish | | | | | | | | |
| Refined pulp (SR > 90) | 100% | 100% | 100% | 100% | 100% | 100% | 100% | 100% |
| Base sheet properties | | | | | | | | |
| Grammage, g/m² | 37.4 | 37.4 | 37.4 | 37.4 | 35.5 | 35.5 | 35.5 | 35.5 |
| Coating | | | | | | | | |
| Hydroxypropylated starch, pph | | 100 | 100 | 100 | | 100 | 100 | 100 |
| Lubricant, parts, pph | | | 1 | 2 | | | 1 | 1 |
| High platy mineral, pph | | | | | | 10 | 10 | 10 |
| Coat weight | | 6.6 | 4.6 | 4.2 | | 5.7 | 8 | 8 |
| Barrier coated sheet properties | | | | | | | | |
| Gurley Hill s/100 ml | 11400 | 42300 | 42300 | 42300 | 14 800 | 42 300 | 42300 | 42300 |
| OTR, 23/50 cc/m²/day | N.D. | N.D. | 110 | >2400 | N.D. | >6000 | 22 | 20 |
| WVTR, 23/50 | | | 92 | 77 | 182 | 212 | 205 | 101 |
| Grease resistance, h | <15 min | <15 min | >24 h | >56 h | <15 min | >5 h | >56 h | >56 h |

The invention claimed is:

1. A biobased barrier film for a paper or paperboard-based packaging material, said barrier film comprising:

a substrate layer; and a coating layer disposed on at least one surface of the substrate layer, wherein said substrate layer has a grammage in a range of 1-60 g/m² and comprises at least 50 wt %, based on a dry weight of the substrate layer, of highly refined cellulose pulp having a Schopper-Riegler (SR) number above 70, as determined by standard ISO 5267-1, and wherein said coating layer has a grammage in a range of 1-15 g/m² and comprises at least 50 wt % of a film forming modified starch and 0.1-10 wt % of a biobased lubricant, based on a dry weight of the coating layer.

2. The barrier film according to claim 1, wherein the substrate layer comprises at least 70 wt % highly refined cellulose pulp based on the dry weight of the substrate layer.

3. The barrier film according to claim 1, wherein the highly refined cellulose pulp has a Schopper-Riegler (SR) number above 85, as determined by standard ISO 5267-1.

4. The barrier film according to claim 1, wherein the substrate layer has a Gurley Hill porosity in a range of 5,000-40,000 s/100 ml, as measured according to standard ISO 5636/5.

5. The barrier film according to claim 1, wherein the coating layer comprises at least 70 wt % film forming modified starch based on the dry weight of the coating layer.

6. The barrier film according to claim 1, wherein the film forming modified starch is selected from a group consisting 12. The barrier film according to claim 1, wherein the barrier film has an oxygen transfer rate (OTR), measured according to the standard ASTM D-3985 at 50% relative humidity and 23° C., of less than 150 cc/m²/day.

13. The barrier film according to claim 1, wherein the barrier film has a water vapor transfer rate (WVTR), measured according to the standard ASTM F1249 at 50% relative humidity and 23° C., of less than 250 g/m²/day.

14. A paper or paperboard based packaging material comprising:

a paper or paperboard base layer; and the barrier film according to claim 1.

15. The paper or paperboard based packaging material according to claim 14, wherein the paper or paperboard has a basis weight in a range of 20-500 g/m².

16. The paper or paperboard based packaging material according to claim 14, having a reject rate according to PTS RH 021/97 of less than 30%.

17. A container comprising:

the barrier film according to claim 1.

18. A method for manufacturing a barrier film for a paper or paperboard based packaging material, comprising the steps of:

a) providing a substrate layer, wherein said substrate layer has a grammage in a range of 1-60 g/m² and comprises at least 50 wt %, based on a dry weight of the substrate layer, of highly refined cellulose pulp having a Schopper-Riegler (SR) number above 70, as determined by standard ISO 5267-1;

b) applying an aqueous coating composition on at least one surface of the substrate layer, wherein said aqueous coating composition comprises at least 50 wt % of a film forming modified starch and 0.1-10 wt % of a biobased lubricant, based on a dry weight of the aqueous coating composition; and c) drying the aqueous coating composition to obtain a coating layer disposed on the at least one surface of the substrate layer, wherein said coating layer has a grammage in a range of 1-15 $g/m^2$.

\* \* \* \* \*

20